United States Patent
Yoneda et al.

(10) Patent No.: US 7,528,340 B2
(45) Date of Patent: May 5, 2009

(54) APPARATUS AND METHOD FOR ELECTRIC DISCHARGE MACHINING AND METHOD OF DISCRIMINATING ELECTRIC DISCHARGE

(75) Inventors: Koji Yoneda, San Jose, CA (US); Tatsuo Toyonaga, San Jose, CA (US)

(73) Assignees: Sodick Co., Ltd., Yokohama, Kanagawa (JP); Sodick America Corporation, San Jose, CA (US)

( * ) Notice: Subject to any disclaimer, the term of this patent is extended or adjusted under 35 U.S.C. 154(b) by 227 days.

(21) Appl. No.: 11/491,028

(22) Filed: Jul. 24, 2006

(65) Prior Publication Data

US 2008/0017615 A1     Jan. 24, 2008

(51) Int. Cl.
*B23H 1/02* (2006.01)
*B23H 7/18* (2006.01)

(52) U.S. Cl. .............. 219/69.13; 219/69.12; 219/69.16; 219/69.18

(58) Field of Classification Search .............. 219/69.12, 219/69.13, 69.16, 69.17, 69.18; 700/162
See application file for complete search history.

(56) References Cited

U.S. PATENT DOCUMENTS

| | | | | |
|---|---|---|---|---|
| 4,152,569 A | * | 5/1979 | Bell et al. ................ | 219/69.16 |
| 4,339,650 A | * | 7/1982 | Tanaka et al. ............ | 219/69.16 |
| 4,983,800 A | * | 1/1991 | Taneda .................... | 216/69.16 |
| 5,750,951 A | | 5/1998 | Kaneko et al. | |
| 5,770,831 A | * | 6/1998 | Kaneko et al. ........... | 219/69.18 |
| 6,211,481 B1 | * | 4/2001 | Toyonaga et al. ........ | 219/69.13 |
| 6,924,453 B2 | * | 8/2005 | Kawahara et al. ........ | 219/69.12 |
| 6,930,273 B2 | * | 8/2005 | Nakashima et al. ...... | 219/69.13 |
| 7,019,246 B2 | * | 3/2006 | Kurihara et al. .......... | 219/69.12 |
| 2004/0193306 A1 | | 9/2004 | Kurihara et al. | |
| 2006/0091113 A1 | * | 5/2006 | Hiraga et al. ............. | 219/69.12 |

FOREIGN PATENT DOCUMENTS

| | | |
|---|---|---|
| JP | 59-000330 B2 | 1/1984 |
| JP | 2002-144153 | 5/2002 |

* cited by examiner

*Primary Examiner*—Geoffrey S Evans
(74) *Attorney, Agent, or Firm*—McDermott Will & Emery LLP

(57) ABSTRACT

An electric discharge machining apparatus comprises a power supply (5) for applying a voltage to a work gap formed between a tool electrode (E) and the workpiece (W) and a motor (7) that moves the tool electrode relative to the workpiece. An electric discharges counter (45) counts a number of electric discharge occurrences within a specified period (Td1) and generating a first count. A gap controller (48) multiplies the first count by a gain to generate position command or speed command for motor drive. An inversion counter (42) counts a number of inversions of the gap voltage upwards or downwards within a second specified period (Td2) and generating a second count. An electric discharge discriminator (44) discriminates the occurrence of electric discharge when the second count reaches a set value.

7 Claims, 5 Drawing Sheets

APPARATUS AND METHOD FOR ELECTRIC DISCHARGE MACHINING AND METHOD OF DISCRIMINATING ELECTRIC DISCHARGE

BACKGROUND OF THE INVENTION

1. Field of the Invention

The present invention relates to an electric discharge machining apparatus in which voltage is applied across a work gap formed between a tool electrode and a conductive workpiece to machine the workpiece. In particular, the present invention relates to a device for controlling the size of the work gap in response to feedback of voltage across the work gap.

2. Description of the Related Art

Generally, a mean voltage across a work gap ("gap voltage") is considered to be proportional to the size or distance of the work gap. In order to maintain the size or distance of the work gap to an optimum value, the gap voltage is fed back to an NC device for electric discharge machining. The NC device controls a motor in accordance with gap voltage feedback to move the tool electrode relative to the workpiece. Wire electric discharge machines and sinker electric discharge machines are mainly known as electric discharge machines. The position of the tool electrode in a sinker electric discharge machine is controlled so as to maintain a mean value of the gap voltage ("mean gap voltage") at a servo reference voltage. In this way, the work gap is maintained at a constant size, material continues to be removed from the workpiece by electric discharge machining, and the tool electrode is advanced towards the workpiece in the direction of a vertical Z-axis. The speed of a wire electrode in wire electric discharge machining is controlled in many cases so that the mean gap voltage is maintained at a servo reference voltage. In this manner, the size of the work gap is kept at an optimum value, and the wire electrode is moved at a controlled speed within the XY plane along a programmed path. Controlling position or speed of the tool electrode according to feedback of the gap voltage in order to maintain the size of the work gap at an optimum value is called servo control. A servo controller determines that the work gap is too narrow if a mean gap voltage is smaller than a servo reference voltage, and increases the size of the gap. On the other hand, if the mean gap voltage is larger than the servo reference voltage, control is performed to make the work gap smaller. Japanese patent application laid-open publication No. 2002-144153 discloses a wire electric discharge machine in which mean gap voltage is detected as a servo control parameter. The wire electric discharge machine of that publication is provided with a divider circuit for dividing mean gap voltage by frequency of electric discharge, and the size of the work gap is controlled according to a difference between the output of the divider circuit and a set value.

In recent years, there has been demand for a degree of surface roughness and dimensional precision of 1 μmRmax or less in electric discharge machines. U.S. Pat. No. 5,750,951 discloses a power supply for applying a high frequency alternating voltage to a work gap in order to finish a workpiece to just such a small degree of surface roughness. It is possible to repeatedly generate a current pulse having an extremely short ON time in the work gap by applying a high frequency a.c. voltage. With this type of μm order finishing, there is little waste generated from the workpiece. Even so, if microscopic machined waste induces leakage current inside the work gap, not all of the energy applied from the power supply to the work gap is put towards electric discharge generating. As a result, non-load voltage is lowered, and a current pulse of a smaller than anticipated energy may be generated, or no current pulse at all. If the mean gap voltage is also lowered due to the lowering of the non-load voltage, the servo controller performs incorrect control to increase the work gap. In this way, a sufficient amount of material is not removed from the workpiece and the desired degree of surface roughness is not obtained.

SUMMARY OF THE INVENTION

An object of the present invention is to provide an electric discharge machining apparatus and method for realizing stable electric discharge machining, controlling a work gap so that an expected number of electric discharges occur.

Another object of the present invention is to provide a method that can accurately discriminate occurrence of electric discharge in the case where an a.c. voltage is applied to the work gap.

According to one aspect of the present invention, the present invention is an electric discharge machining apparatus for machining a workpiece by electric discharge using a tool electrode includes a power supply for applying a voltage to a work gap formed between the tool electrode and the workpiece to cause electric discharge, a motor that moves the tool electrode relative to the workpiece, a discharge counter for counting a number of electric discharge occurrences within a specified period and generating a count and a gap controller for multiplying the count by a gain to generate position command or speed command for motor drive.

The electric discharge machining apparatus may further include a gap voltage detector for detecting gap voltage, an inversion counter for counting a number of inversions of the gap voltage upwards or downwards within a second specified period and generating a second count, and an electric discharge discriminator for discriminating the occurrence of electric discharge when the second count reaches a set value. In this way, electric discharge discriminator for discriminating the occurrence of electric discharge when the second count reaches a set value. In this way, electric discharge occurring due to application of an a.c. voltage is accurately detected.

It is also possible for the electric discharge machining apparatus to include a mean gap voltage detector for detecting mean gap voltage, a second gap controller for multiplying a difference between the mean gap voltage and a servo reference voltage by a second gain to generate position command or speed command for motor drive, and a servo control parameter selector for selectively operating one of the first and second gap controllers. In this way, the servo control parameters are appropriately selected according to a machining stage.

According to another aspect of the present invention, the present invention is an electric discharge machining method for machining a workpiece by causing electric discharge in a work gap formed between a tool electrode and a workpiece. The method steps include applying a voltage to the work gap to cause electric discharge, counting a number of electric discharge occurrences within a specified period and generating a count and controlling size of the work gap according to an amount of movement which is the count multiplied by a gain.

According to yet another aspect of the present invention, the present invention is a method for discriminating the occurrence of electric discharge in a work gap formed between a tool electrode and a workpiece in electric discharge machining. The method steps include applying an a.c. voltage to the work gap, counting a number of inversions of the gap voltage upwards or downwards within a specified period and generating a count, and comparing the count with a set value and discriminating the occurrence of electric discharge when the count reaches the set value.

DESCRIPTION OF THE PREFERRED EMBODIMENTS

Figure 1:
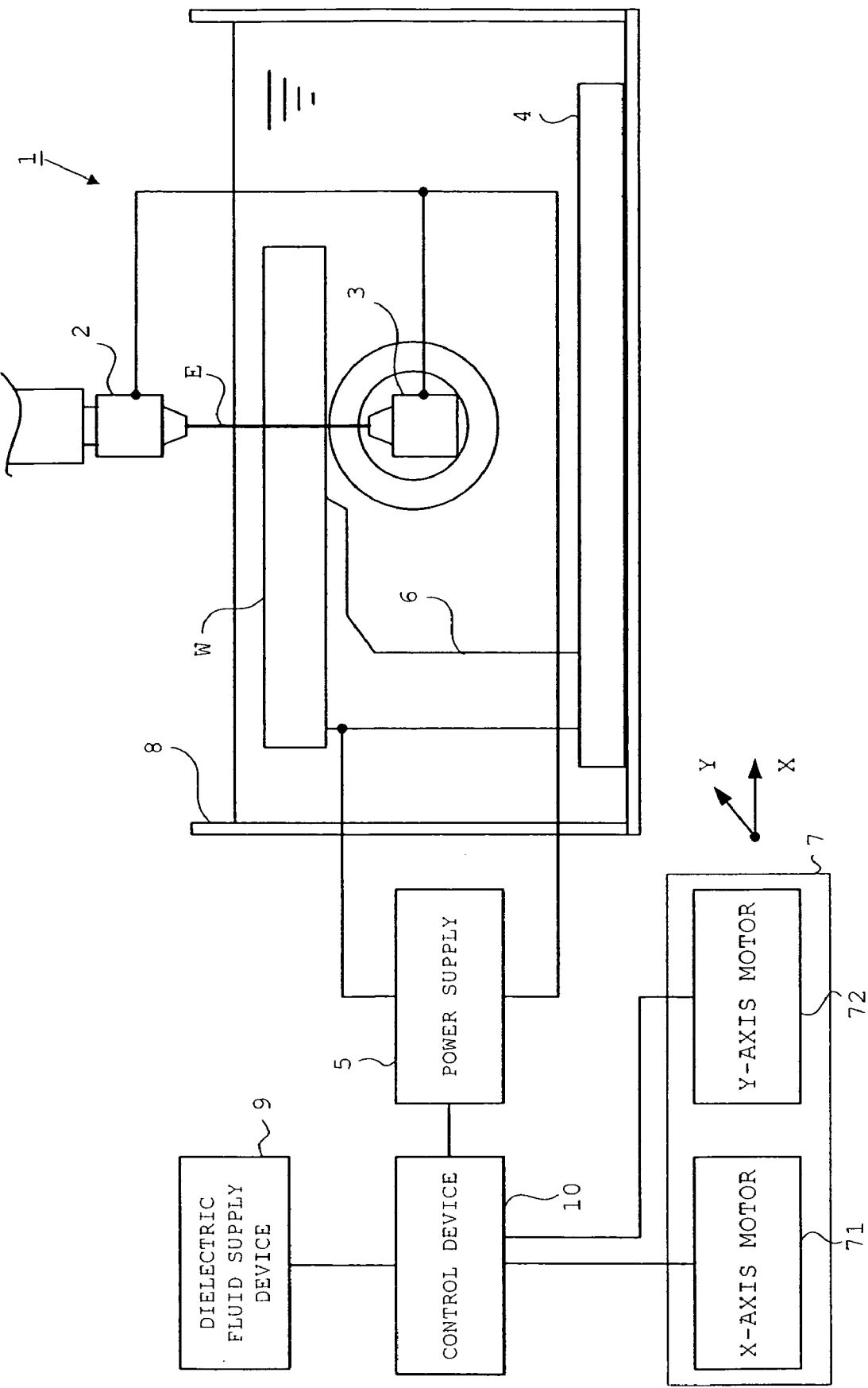
FIG. 1 is a drawing showing an electric discharge machining apparatus of the present invention.

An electric discharge machining apparatus of the present invention will be described in detail with reference to FIG. 1, FIG. 2, FIG. 3 and FIG. 4.

In a wire electric discharge machining apparatus 1, a wire electrode E is continuously supplied as a tool electrode between an upper guide assembly 2 and a lower guide assembly 3. A table 4 is provided inside a work tank 8, and the work stand 6 is vertically fixed to the table 4. A workpiece W is attached to a work stand 6 by means of suitable clamp jig. The work tank 8 is filled with dielectric fluid during machining. The wire electrode E and the workpiece W are connected to a power supply 5 by means of appropriate power cables. The power supply 5 can apply a d.c. voltage or a.c. voltage to the work gap formed between the wire electrode E and the workpiece W in order to cause electric discharge in the work gap. The power supply 5 includes a d.c. power supply for applying a d.c. voltage pulse. The power supply 5 further includes a device for converting a d.c. voltage to an a.c. voltage or an a.c. power supply. An X-axis motor 71 and a Y axis motor 72 for moving the table 4 within an X-Y plane are provided at appropriate places in the wire electric discharge machining apparatus 1. A controller 10 controls the X-axis and Y-axis motors 71 and 72, the power supply 5 and a dielectric fluid supply device 9. During machining, the wire electrode E is moved along a programmed path relative to the workpiece W within an XY plane while a d.c. voltage pulse or an a.c. voltage is applied to the work gap. The dielectric fluid supply device 9 supplies dielectric fluid to the work gap, and continuously flushes waste that has been removed from the workpiece W.

Figure 2:
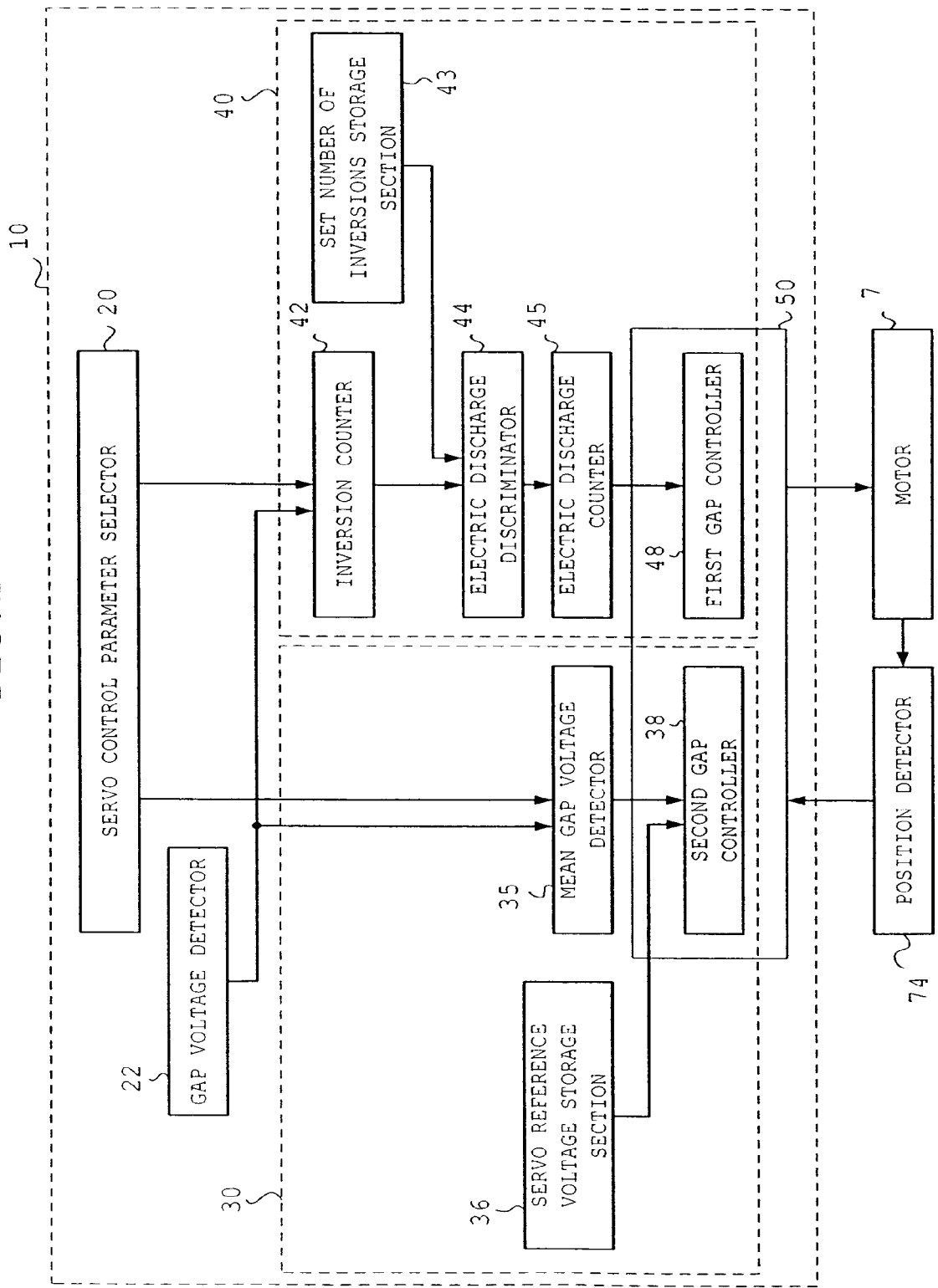
FIG. 2 is a block diagram showing the controller of FIG. 1.

As shown in FIG. 2, the controller 10 includes a servo control parameter selector 20, a gap voltage detector 22, a mean gap voltage detector 35, a servo reference voltage storage section 36, inversion counter 42, a set number of inversions storage section 43, an electric discharge discriminator 44, an electric discharges counter 45 and a gap controller 50. These sections function together to control an amount of movement of the motor 7.

In order to simplify the description, a single motor is illustrated in FIG. 2. The servo control parameter selector 20 is provided with a selection button, and selectively causes operation in one of a mean gap voltage selection zone 30 and a number of electric discharge occurrences selection zone 40.

It goes without saying that the servo control parameter selector 20 has a function of selecting either mean gap voltage or number of electric discharge occurrences as a servo control parameter. If the operator turns the selection button OFF, mean gap voltage is selected, and the mean gap voltage selection zone 30 functions. If the operator turns the selection button ON, number of electric discharge occurrences is selected, and the number of electric discharge occurrences selection zone 40 functions. Normally, in the case of finishing requiring a μm order precision (hereafter simply referred to as finishing) the selection button is ON, and for rough machining before finishing the selection button is OFF. The gap voltage detector 22 detects voltage across the work gap and supplies the gap voltage to the mean gap voltage detector 35 and the inversion counter 42. The mean gap voltage selection zone 30 includes the mean gap voltage detector, servo reference voltage storage section and second gap controller 38. The number of electric discharges selection zone 40 includes the inversion counter 42, set number of inversions storage section 43, electric discharge discriminator 44, electric discharge counter 45 and first gap controller 48.

Figure 3:
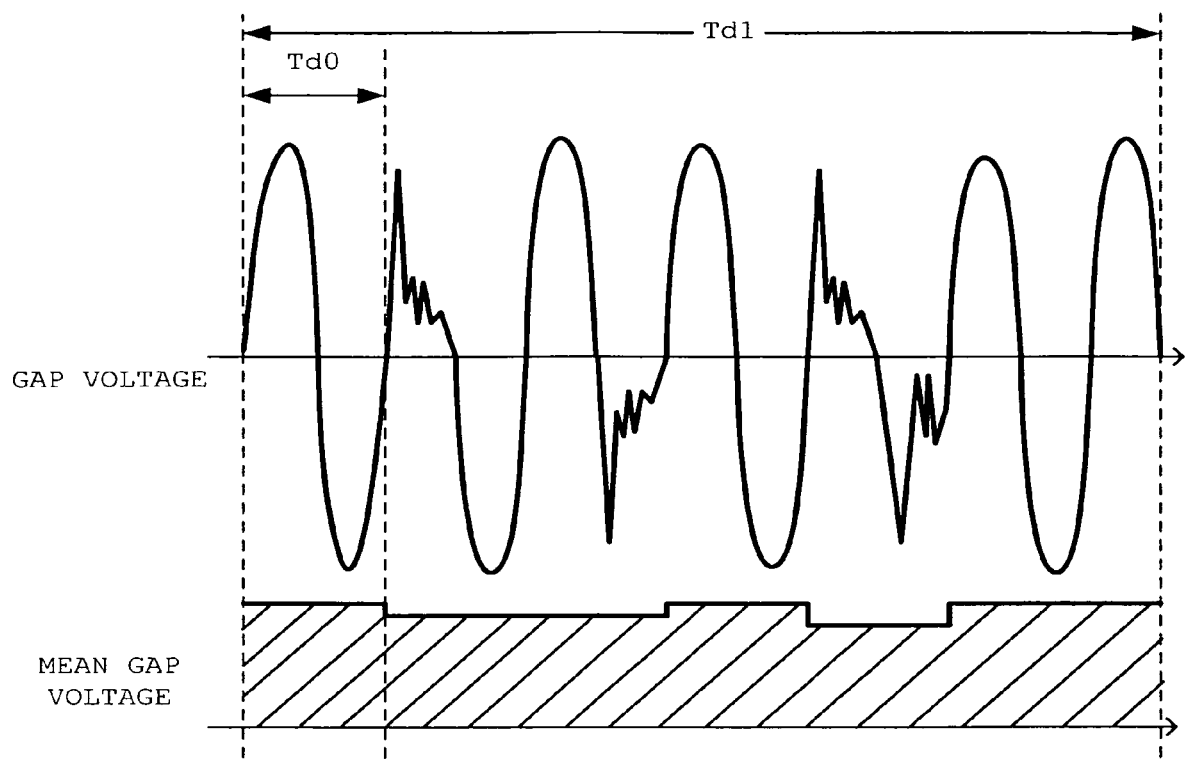
FIG. 3 is a timing chart showing gap voltage and mean gap voltage when an a.c. voltage is applied to the work gap.

The mean gap voltage detector 35 detects the mean of the gap voltage, and supplies the detected mean gap voltage, to the second gap controller 38. When the power supply 5 applies an a.c. voltage to the work gap, the mean gap voltage is obtained by accumulating absolute values of the gap voltage per specified time Td0, as shown in FIG. 3. Time Td0 is, for example, one cycle of the a.c. By supplying this type of high frequency a.c. voltage to the work gap, it is possible to repeatedly cause electric discharge of microscopic energy at high frequency as well as to carry out finishing at high speed and with high precision. The servo reference voltage storage section 36 stored a servo reference voltage set by the operator.

Figure 4:
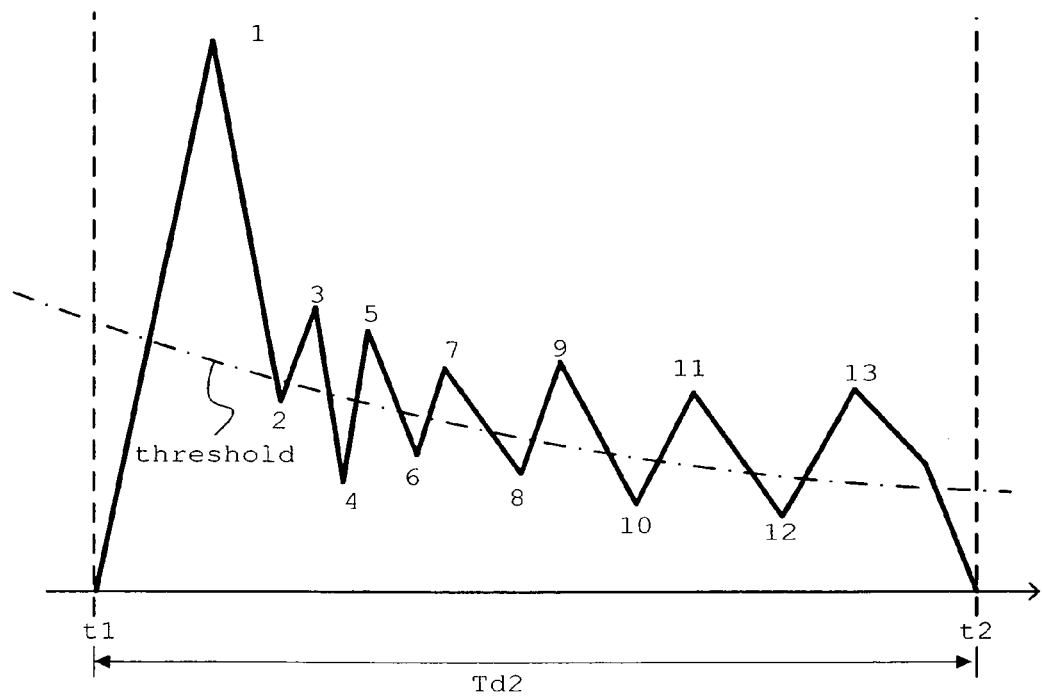
FIG. 4 is a timing chart showing a count for number of inversions when an a.c. voltage is applied to the work gap.

When number of electric discharge occurrences is selected as the servo control parameter, it is necessary to accurately determine whether or not electric discharge has occurred within a half cycle of the high frequency a.c. voltage. Electric discharge occurrence within a half cycle of the a.c. voltage is therefore discriminated using the number of inversions of the gap voltage. As shown in FIG. 4, the inversion counter 42 counts the number of times the gap voltage inverts within the specified time Td2, is either upwards or downwards. The time Td2 is a period from time t1 when application of the voltage to the work gap starts to time t2 when the voltage becomes zero. Specifically, time Td2 is a half cycle of the a.c. voltage. The number of inversions is obtained, for example, by comparing the gap voltage with a predetermined threshold value. Alternatively, in order to count the number of inversions the gap voltage is detected for every extremely short period of time, a difference in detected values before and after are calculated and a number of times the value inverts to the plus side and minus side is obtained. The number of inversions counter 42 supplies the count to the electric discharge discriminator 44. A number of inversions required to determine whether or not electric discharge has occurred within time Td2 is set, and the set value is stored in the set number of inversions storage section 43. The electric discharge discriminator 44 reads the set value in the set number of inversions storage section 43 and it is determined whether or not electric discharge has occurred by comparing the count with the set value. When the count is the set value or higher, it is determined that electric discharge has occurred. On the other hand, when the count is smaller than the set value, it is determined that electric discharge has not occurred. The electric discharge counter 45 counts the number of electric discharges within a specified period Td1, and also has a function to supply the count to the first gap controller 48. Time Td1 is longer than time Td2.

The gap controller 50 has first and second gap controllers 48 and 38, and calculates an amount of movement for the motor 7 based on selected servo control parameter. The gap controller 50 supplies an amount of movement to a drive section (not shown) of the motor 7 in the form of position command or speed command. Position of the motor 7 is detected by the position detector 74. Position feedback is sent to the gap controller 50 and the gap controller 50 always monitors whether or not the position feed back matches the position command. The first gap controller 48 pre-stores a gain and the following equation (1) calculating an amount of movement for the motor 7.

$$a1 = y \times f(y)$$

a1: amount of movement for motor
y: count for electric discharge
f(y): gain

The first gap controller 48 multiplies the count for electric discharge by a gain based on equation (1) to calculate an amount of movement for the motor 7. The calculation result is supplied to the drive section for the motor 7 as position command or speed command. The first gap controller 48 moves the tool electrode E relative to the workpiece W so as to cause a desired number of electric discharges, when machining with a μm order precision is required. As a result, the workpiece W is finished to a predetermined degree of surface roughness. The second gap controller 38 pre-stores a gain and the following equation (2) for calculating an amount of movement for the motor 7.

$$a2 = B \times f(B)$$

a2: amount of movement for motor
B: difference between mean gap voltage and servo reference voltage.
f(B): gain The second gap controller 38 compares the mean gap voltage with the servo reference voltage, and if they are different calculates an amount of movement for the motor 7 based on equation (2).

Figure 5:
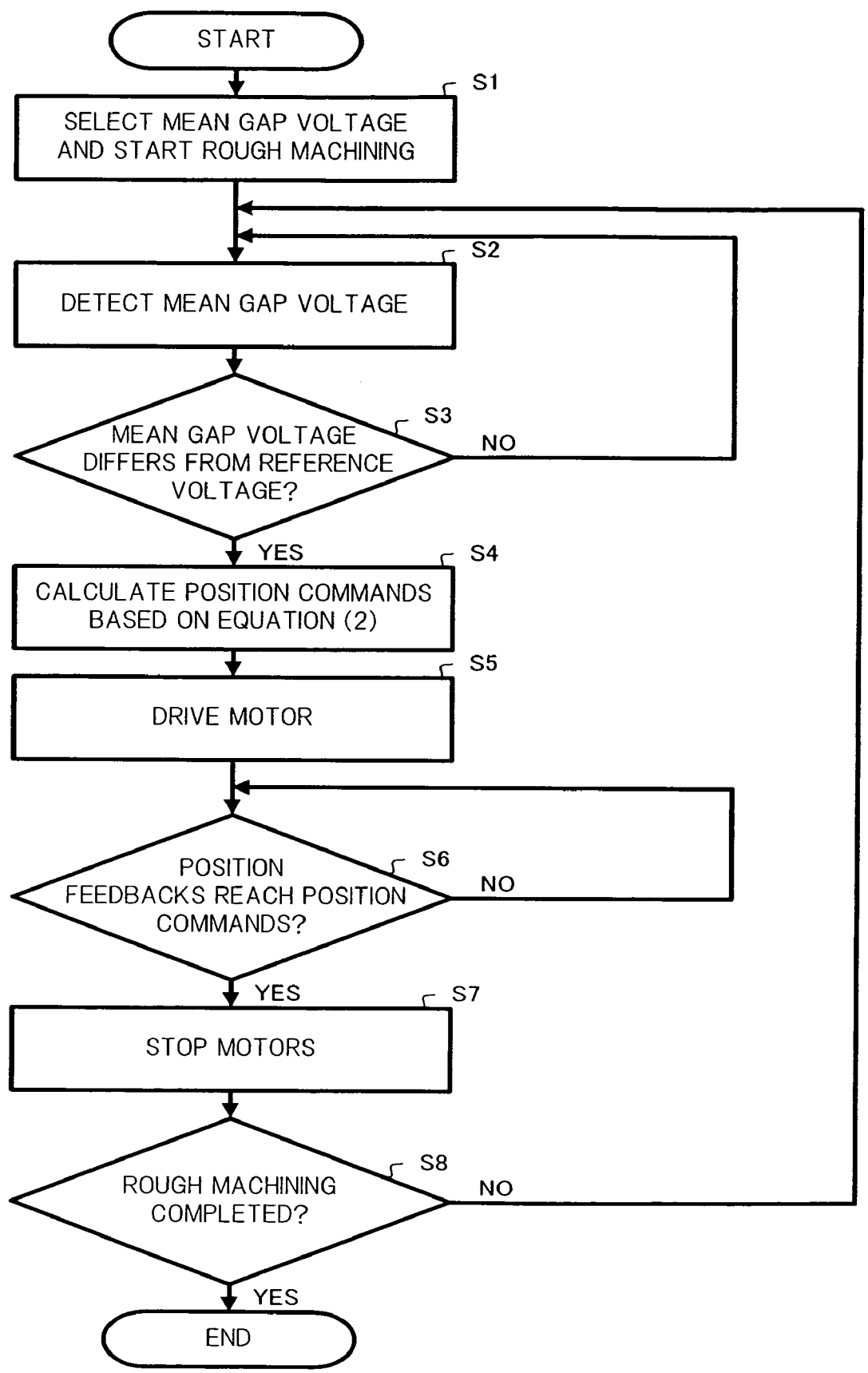
FIG. 5 is a flowchart showing operation of the controller when mean gap voltage has been selected as a servo control parameter.

Next, servo control by the controller 10 will be described with reference to the flowcharts shown in FIG. 5 and FIG. 6.

First of all, prior to machining, machining conditions lasting from rough machining to finishing are set by the operator. Servo reference voltage is included in machining conditions, and a set value for servo reference voltage is stored in the servo reference voltage storage section 36. A number of inversions required to determine whether or not electric discharge has occurred is also set. A set value for the number of inversions is stored in the set number of inversions storage section 43. In step S1 in FIG. 5, the servo control parameter selector 20 selects mean gap voltage as the servo control parameter, and the controller 10 starts rough machining of the workpiece W by application of an a.c. voltage or d.c. voltage. In step S2, the mean gap voltage detector 35 detects mean gap voltage in one cycle Td0 of a.c. voltage. In step S3, the second gap controller 38 compares the mean gap voltage with the servo reference voltage in the servo reference voltage storage section 36. If the mean gap voltage is different from the servo reference voltage, process proceeds to step S4. Otherwise, process returns to step S2. In step S4, the second gap controller 38 calculates position command or speed command in order to drive the motor 7 based on equation (2). In step S5, the motor 7 is driven based on position command or speed command from the drive section. In step S6, the second gap controller 38 compares the position feedback from the position detector 74 with the position command. Alternatively, the second gap controller 38 compares speed feedback, which can be a differential value of the position feedback, with the speed command. If the position feedback reaches the position command, the second gap controller 38 stops the motor 7 in step S7. Operations from step S2 to step S7 are repeated until rough finishing is completed in step S8.

Figure 6:
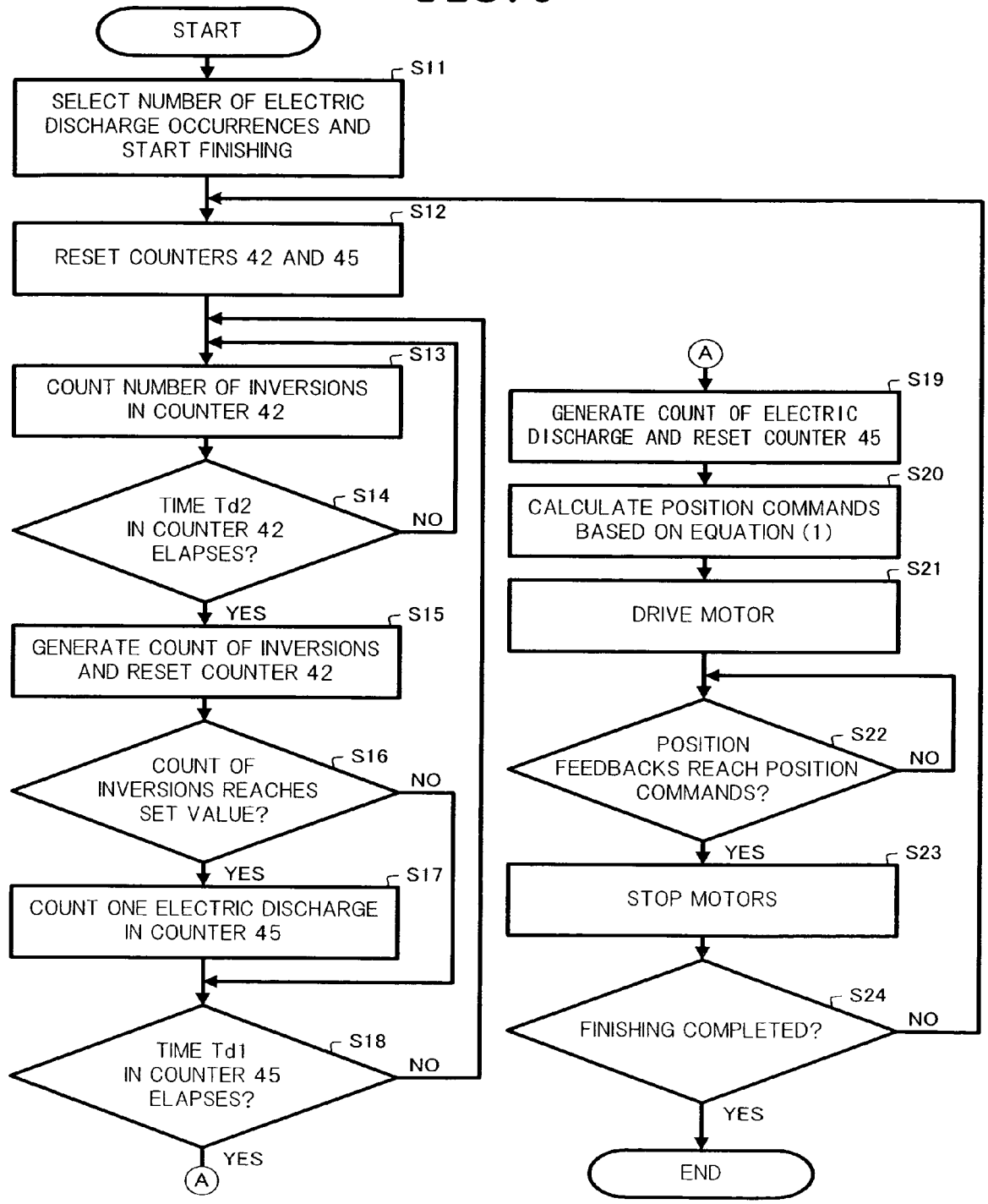
FIG. 6 is a flowchart showing operation of the controller when number of electric discharge occurrences has been selected as a servo control parameter.

Next, in step S11 in FIG. 6, the servo control parameter selector 20 selects number of electric discharge occurrences as the servo control parameter, and the controller 10 starts finishing of the workpiece W by application of an a.c. voltage. The frequency of the a.c. voltage is set to about 1 MHz. In step S12, the inversion counter 42 and the electric discharge counter 45 are reset. In step S13, the inversion counter 42 counts a number of inversions of the gap voltage upwards or downwards. In step S14, if the time Td2 elapses process proceeds to step S15. Otherwise, process proceeds to step S13. In step S15, the inversion counter 42 supplies the count to the electric discharge discriminator 44, and is reset again. In step S16, the electric discharge discriminator 44 compares the count with the set value in the set number of inversions storage section 43. If the count reaches the set value, process proceeds to step S17. Otherwise, process skips to step S18. In step S17, the electric discharge discriminator 44 determines that electric discharge has occurred, and the electric discharge counter 45 increases the count by 1. In step S18, if the time Td1 elapses process proceeds to step S19. Otherwise, process loops back to step S13. In step S19, the electric discharge counter 45 supplies the count to the first gap controller 48, and is reset again. In step S20, the first gap controller 48 calculates position command or speed command in order to drive the motor 7 based on equation (1). Steps S21, S22 and S23 are the same as steps S5, S6 and S7. Operations from step S12 to step S23 are repeated until finishing is completed in step S24.

The present invention is not intended to be limited to the disclosed form. It is clear that many improvements and variations are possible with reference to the above description. For example, a servo control parameter is changed by an operator using a selection button. Alternatively, the servo control parameter may be automatically changed from mean gap voltage to number of electric discharge occurrences after rough machining is completed. The illustrated embodiment was selected to explain the essence and practical application of the invention. The scope of the invention is defined by the attached claims.

The invention claimed is:

1. An electric discharge machining apparatus for machining a workpiece by electric discharge using a tool electrode, comprising:
    a power supply for applying a voltage to a work gap formed between the tool electrode and the workpiece to cause electric discharge;
    a motor that moves the tool electrode relative to the workpiece;
    an electric discharge counter for counting a number of electric discharge occurrences within a first specified period and generating a first count;
    a gap controller for multiplying the first count by a first gain to generate position command or speed command for driving the motor;
    a gap voltage detector for detecting a gap voltage;
    an inversion counter for counting a number of inversions of the gap voltage upwards or downwards within a second specified period and generating a second count; and an electric discharge discriminator for discriminating the occurrence of electric discharge when the second count reaches a set value.

2. The electric discharge machining apparatus of claim 1 wherein the gap voltage detector detects an a.c. voltage and the second specified period is half cycle of the a.c. voltage.

3. The electric discharge machining apparatus of claim 1, further comprising:
   a mean gap voltage detector for detecting mean gap voltage;
   a second gap controller for multiplying a difference between the mean gap voltage and a servo reference voltage by a second gain to calculate position command or speed command for driving the motor; and
   a servo control parameter selector for selectively operating one of the first and second gap controllers.

4. An electric discharge machining method for machining a workpiece by causing electric discharge in a work gap formed between a tool electrode and a workpiece, comprising the steps of:
   applying a voltage to the work gap to cause electric discharge;
   counting a number of electric discharge occurrences within a specified period and generating a count;
   controlling size of the work gap according to an amount of movement that is the count multiplied by a gain;
   counting a number of inversions of the gap voltage upwards or downwards within a second specified period to generate a second count; and
   discriminating the occurrence of electric discharge when the second count reaches the set value.

5. The electric discharge machining method of claim 4, wherein the step of applying a voltage includes a step of applying an a.c. voltage to the work gap and the second specified period is half cycle of the a.c. voltage.

6. A method for discriminating the occurrence of electric discharge in a work gap formed between a tool electrode and a workpiece in electric discharge machining, comprising the steps of:
   applying an a.c. voltage to the work gap;
   counting a number of inversions of the gap voltage upwards or downwards within a specified period and generating a count; and
   comparing the count with a set value and discriminating the occurrence of electric discharge when the count reaches the set value.

7. The method for discriminating the occurrence of electric discharge of claim 6, wherein the specified period is half cycle of the a.c. voltage.

* * * * *